United States Patent [19]
Liu

[11] Patent Number: 5,784,952
[45] Date of Patent: Jul. 28, 1998

[54] TURNTABLE ASSEMBLY

[76] Inventor: Shu Lien Liu, 2F. No. 33, Lane 52, Szu-Wei Road, Taipei, Taiwan

[21] Appl. No.: 944,416

[22] Filed: Oct. 6, 1997

[30] Foreign Application Priority Data

Oct. 16, 1996 [TW] Taiwan ................ 85215919

[51] Int. Cl.⁶ .............. A47J 36/26; A47J 39/02; F24C 5/00
[52] U.S. Cl. .............. 99/483; 99/448; 126/43; 126/275 R; 219/214; 219/218
[58] Field of Search .............. 99/448, 483; 126/43, 126/21 A, 275 R, 273 R; 211/78, 131.1, 70; 219/217, 218, 201, 214, 464, 467, 443; 248/371, 346.06, 921; 312/305, 125, 135, 238; 108/26, 94

[56] References Cited

U.S. PATENT DOCUMENTS

| | | | |
|---|---|---|---|
| 3,213,849 | 10/1965 | Hirsch | 126/43 |
| 3,636,299 | 1/1972 | Stewart, Jr. | 108/94 X |
| 3,851,599 | 12/1974 | Bridges | 108/25 |
| 3,972,419 | 8/1976 | Short | 211/78 |
| 4,243,013 | 1/1981 | Goon et al. | 126/43 |
| 4,433,885 | 2/1984 | Baker | 312/305 |
| 4,494,720 | 1/1985 | Gregory et al. | 248/371 |
| 4,747,352 | 5/1988 | Guidry et al. | 108/50 |
| 5,077,460 | 12/1991 | Rocha et al. | 219/218 X |
| 5,189,282 | 2/1993 | Rocha et al. | 219/467 |
| 5,203,255 | 4/1993 | Wells et al. | 99/483 |
| 5,421,271 | 6/1995 | Sui | 108/50 |
| 5,431,091 | 7/1995 | Couture | 99/448 X |

Primary Examiner—Timothy F. Simone

[57] ABSTRACT

A turntable assembly generally comprises a supporting base and an oven fixed to the top of the supporting base. A rotational disk can be rotationally and movably supported between the oven and the supporting base. The rotational disk is above the surface of the table without touching the dishes or bowls disposed on the table. By this arrangement, a plurality of courses can be simultaneously supported and the people may enjoy these food simultaneously.

4 Claims, 6 Drawing Sheets

TURNTABLE ASSEMBLY

BACKGROUND OF THE INVENTION

1. Field of the Invention

The present invention relates to a turntable assembly, more particularly, to a rotational tableware supporting device having at least one rotational disk each with a plurality of supporting brackets which are extended radially and outward for receiving a dish or bowl thereon.

2. Description of Prior Art

As our economic growth and success have brought a great deal of wealth to those who are diligent at work. Getting stuffed is not the priority. All of our people are now pursuing something special for meals. However, when a plurality of courses are provided, a larger size of table is also required. Normally, the size of the table is fixed and the dishes or plates are also disposed at a fixed position. If someone is sit opposite to a special course which he/she prefers, he/she can only eat it with eyes since he/she can not get it as the distance is too long to reach.

An additional turntable has been introduced and which can be disposed in the center of the table and the course can be rotated to the front position of the people. However, this turntable is quite small as compared to the table and it can not provide a robust space for each of the courses. As a result, the course shall be provided one after the other. Even the preferable one is not finished, when the new course comes, it shall be moved out for the new one. This always happen when eating in a restaurant or hotel. This has been the common experience for all of us and right now it has not been successfully solved.

SUMMARY OF THE INVENTION

It is the objective of this invention to provide a turntable assembly having a rotational tableware supporting device in which a plurality of courses can be served on one table simultaneously and the conventional problem can be completely solved.

It is still the objective of this invention to provide a turntable assembly having a compact rotational tableware supporting device which can be disposed at a small table and a plurality of courses can be supported evenly around the supporting device. In light of this, the use may conveniently enjoy the food disposed in front of him/her.

In order to achieve the objectives set forth, the turntable assembly having a rotational tableware supporting device generally comprises a supporting base which has an enlarged bottom with a narrow upper portion and a tapped top. An oven can be fixed to the top of the supporting base. A rotational disk member can be rotationally and movably supported between the oven and the supporting base. The rotational disk member is above the surface of the table without touching the dishes or bowls disposed on the table. With this arrangement, a plurality of courses can be simultaneously served and supported and the people may enjoy these food simultaneously.

According to one preferable embodiment of the present invention of the rotational tableware supporting device, a multi-layer of rotational disk members can be rotationally supported between the oven and the supporting base to meet different requirements.

BRIEF DESCRIPTION OF DRAWINGS

In order to be more readily understood the present invention, the following description is given, merely by way of example with reference to the accompanying drawings, in which.

DETAILED DESCRIPTION OF PREFERRED EMBODIMENTS

Figure 1:
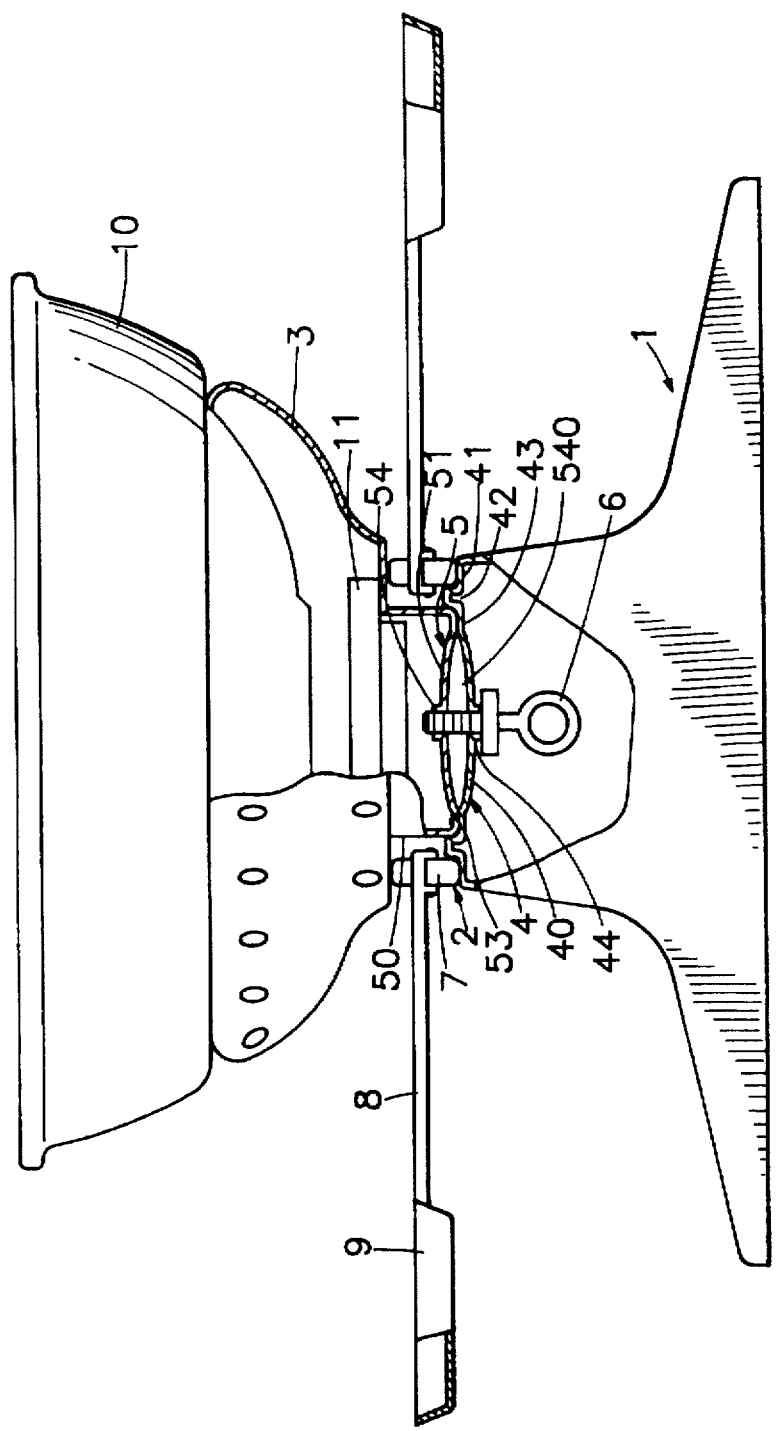
FIG. 1 is a cross sectional view of the first embodiment of the rotational tableware supporting device made according to the present invention.
Figure 2:
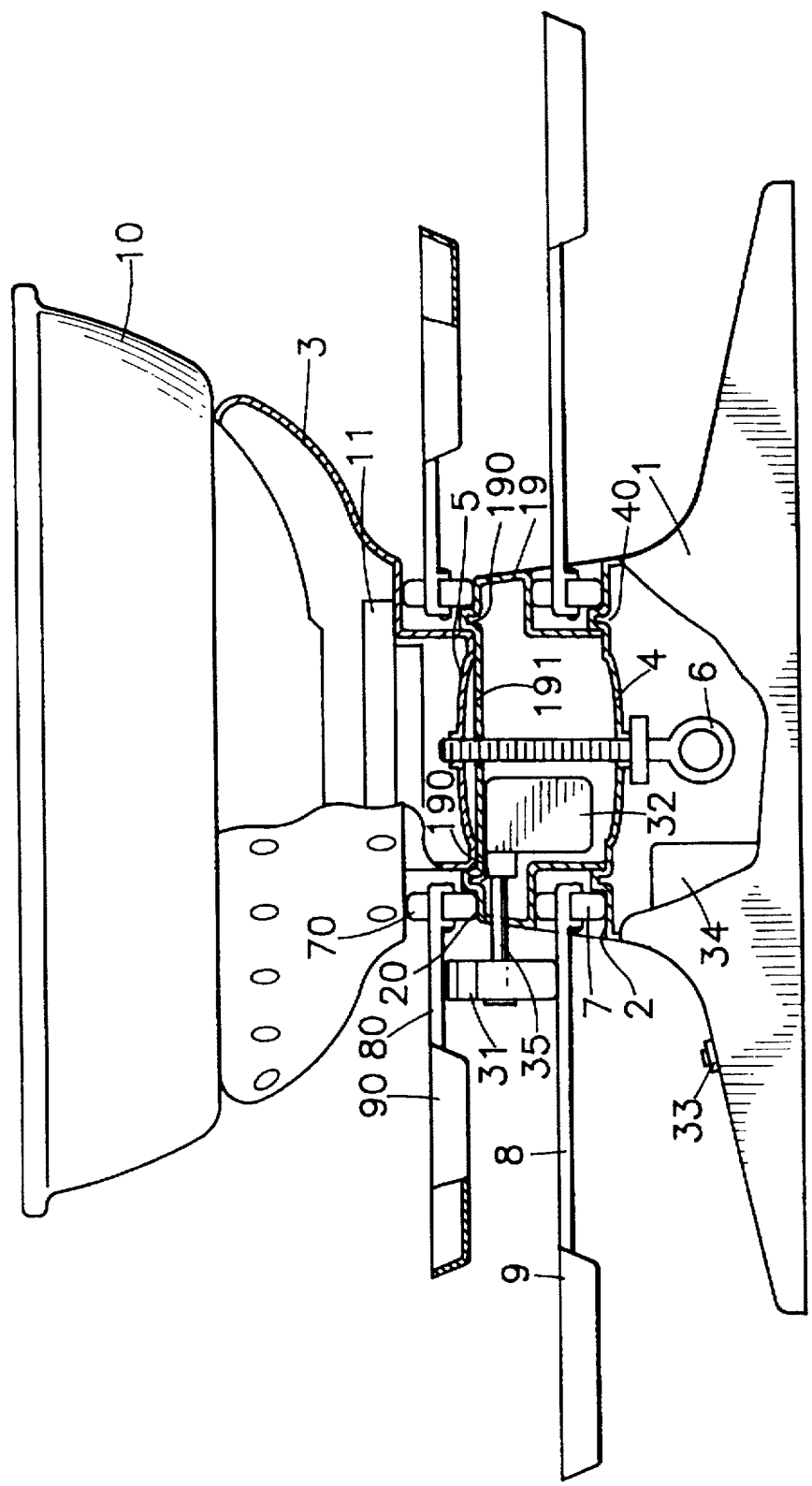
FIG. 2 is a cross sectional view of the second embodiment of the rotational tableware supporting device made according to the present invention.
Figure 3:
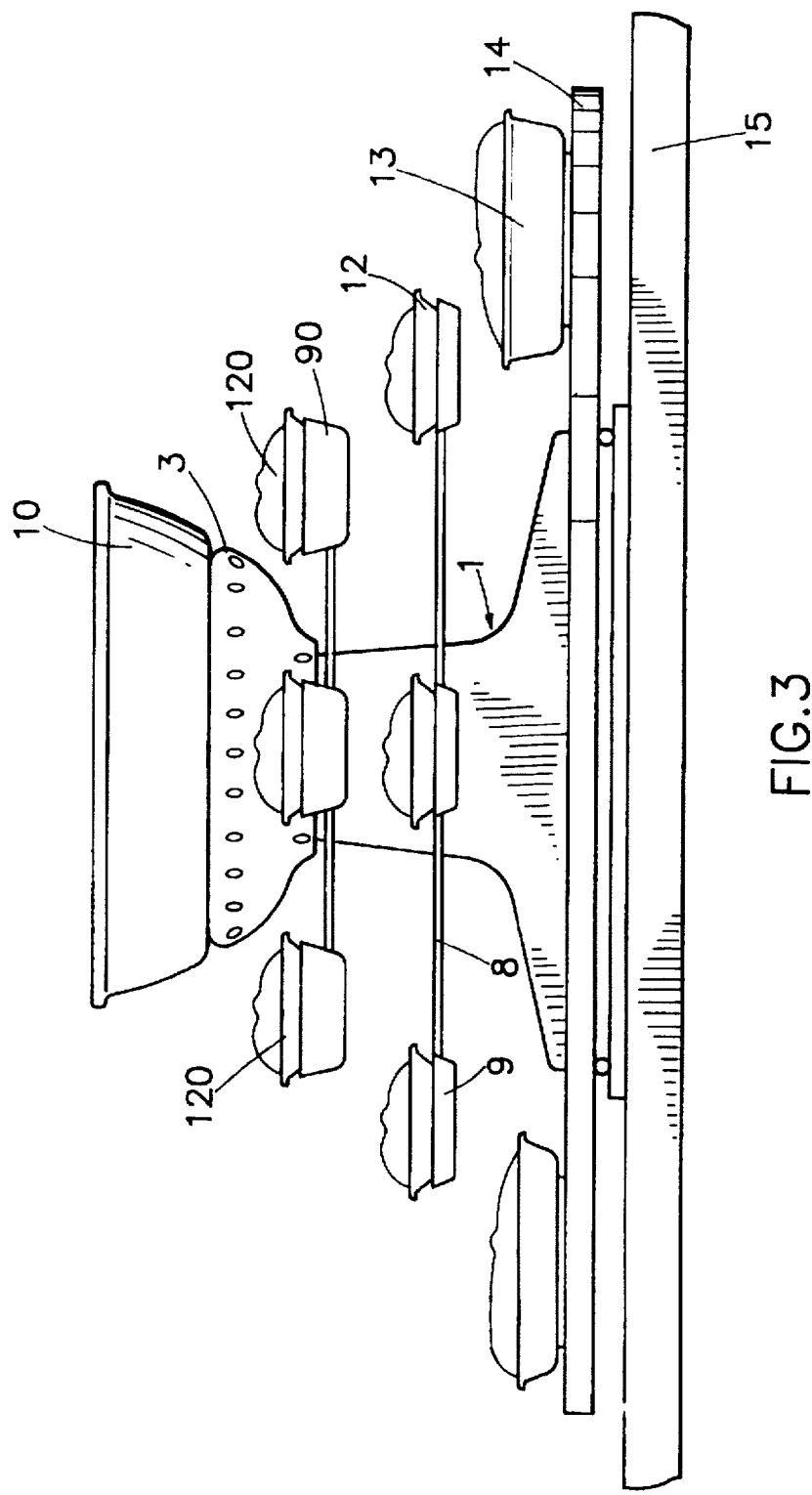
FIG. 3 is a schematic illustration showing the utilization of the rotational tableware supporting device.

In general, the turntable assembly according to this invention having a rotational tableware supporting device generally includes a supporting base 1 and a rotational disk 8 which has a plurality of rollers 7 at central portion and can be rotated on the supporting base. The supporting base 1 features an enlarged bottom and a narrow upper portion. The upper portion of the supporting base is provided with a first connecting portion 4 and an oven 3 can be fixedly attached to the top of the supporting base 1. The bottom of the oven 3 is provided with a second connecting portion 5 which can be fixedly engaged with the first connecting portion 4 of said supporting base 1 by means of a fastening device 6. A bowl or pot 10 can be removably supported by the oven 3. An annular recessed guiding rail 2 disposed between the first and second connecting portions 4, 5 and the rollers 7 of the rotational disk 8 may suitably run therein. The rotational disk 8 is configured to receive a plurality of dishes/plates or bowls 12 thereon. Since the rotational disk 8 is disposed above the table and when the rotational disk is rotated, the dishes/plates or bowls 12 disposed on the top surface of the table will not be crashed. By the provision of the rotational disk, an additional surface for supporting and positioning dishes/plates and bowls are provided.

Referring to FIG. 1, according to the first preferred embodiment of the present invention, the turntable assembly having a rotational tableware supporting device comprises a supporting base 1 which includes an enlarged bottom and a narrow upper portion having an oven 3 firmly supported thereon. The enlarged bottom provided a lower center of gravity such that the supporting base 1 may stand firmly on the table. The upper portion of the supporting base 1 is provided with a first connecting portion 4 for receiving the oven 3 thereon. The first connecting portion 4 includes a central recessed portion 40 which has an annular periphery portion 43 at the outer periphery of the central recessed portion 40, a through hole 44 at center and an annular flange 42 which has an annular shoulder 41, at outer periphery of said annular periphery portion 43, which serves a guiding rail 2 for the roller assembly 7 of the rotational disk 8. The oven 3 includes an open bowl at the top for receiving hot pot or larger bowl 10 and a second connecting portion 5 at the bottom which has a downward extension 50 having a central upward recessed portion 51, an annular periphery portion 53 at the outer periphery of the upward recessed portion 51, and a locking nut 54 at the center. The extension 50 is configured such that the extension 50 can be received within the recessed portion 40 of the first connecting portion 4 and the locking nut 54 is aligned with the through hole 44 and a mouth gap 540 is formed therebetween. When the second connecting portion 5 is seated onto the first connecting portion 4, a locking bolt 6 can be inserted through the through hole 44 and locked onto the locking nut 54. With this arrangement, the first and second connecting portions 4 and 5 are releasably engaged together by said locking nut 54 and bolt 6. When the oven 3 is releasably attached to the supporting base 1, the annular periphery surfaces 43 and 53 are closely contacted with each other and when the locking bolt 6 is locked to the locking nut 54, the recessed portion 40 is compressed to extend outward and radially with the recessed portion 51. In this manner, said mouth gap 540 will be getting narrow. By the relative limitation of the annular periphery surface 43 around the recessed portion 40 and the annular periphery surface 53 around the recessed portion 51, an accurate guiding rail 2 for the roller assembly 7 of the rotational disk 8 is defined therebetween and this guiding rail 2 will not be influenced by the tightness of the locking bolt 6 and the locking nut 54. The size of the guiding rail 2 defined between the supporting base 1 and the oven 3 is kept steadily, the roller assembly 7 of the rotational disk 8 may smoothly run thereon.

On the other hand, it can be readily seen from the drawing that the inner rim of the roller assembly 7 is guided by the annular flange 42, as a result, the rotational disk 8 is well positioned by the guiding rail 2. In light of this, the rotational disk 8 can be readily moved around the guiding rail 2 with relative lower frictional resistance. Even the user may use the tip of the chopsticks to move the rotational disk 8. As a result, the desired course can be readily served and positioned around the supporting base 1 for everyone.

Referring to FIGS. 2 to 5, the second embodiment of the present invention is shown. The rotational tableware supporting device of this embodiment is almost identical with the above mentioned first embodiment and also comprises a supporting base 1 provided with a first connecting portion 4 and an oven 3 provided with a second connecting portion 5. However, in this embodiment, an intermediate connecting means 19 is further provided between the first connecting portion 4 and the second connecting portion 5. The intermediate connecting means 19 includes a top platform 191, an annular flange 190 with an annular shoulder 192 at top portion thereof which is identical with the flange 42 with the shoulder 41 of the supporting base 1, an upper peripheral projection 193 and a lower extending portion 194. As a result, an upper guiding rail 20 is formed when the second connecting portion 5 is engaged with said top platform 191 of said intermediate connecting means 19. In the same way, a low guiding rail 2 is also formed when said lower extending portion 194 is engaged with said central recessed portion 40 of said first connecting portion 4 of said support base 1. Finally a locking bolt 6 can be applied to lock the oven 3, the intermediate means 19 and the supporting base 1 altogether. As a result, the guiding rail 2, 20 are thus formed, when the oven 3 is integrally attached to the supporting base 1 through said intermediate connecting means 19, two rotational disks 8, 80 having rollers assemblies 7, 70 can be disposed therebetween respectively, such that rollers assemblies 7, 70 are well supported by the guiding rails 2, 20. In this embodiment, a driving motor 32 is provided inside said intermediate connecting means 19, and a driving shaft 35 is extending through out said intermediate connecting means 19. A power supply 34 provided in said support base 1 supplying power to said motor 32 through a switch 33 which is provided on an outer surface of said support base 1. The free end of said driving shaft 35 is provided with a driving wheel 31 which engages with both of the rotational disks 8 and 80. In this manner, when the rotational disks 8, 80 are to be moved, all you have to do is only to push said switch 33 on, said driving wheel 31 will drive said rotational disks 8, 80 to rotate in a very constant low speed. Therefore, at least two stories of rotational disks 8, 80 are rotationally disposed between the supporting base 1 and the oven 3 and a plurality of courses can be simultaneously served and supported thereof.

Figure 4:
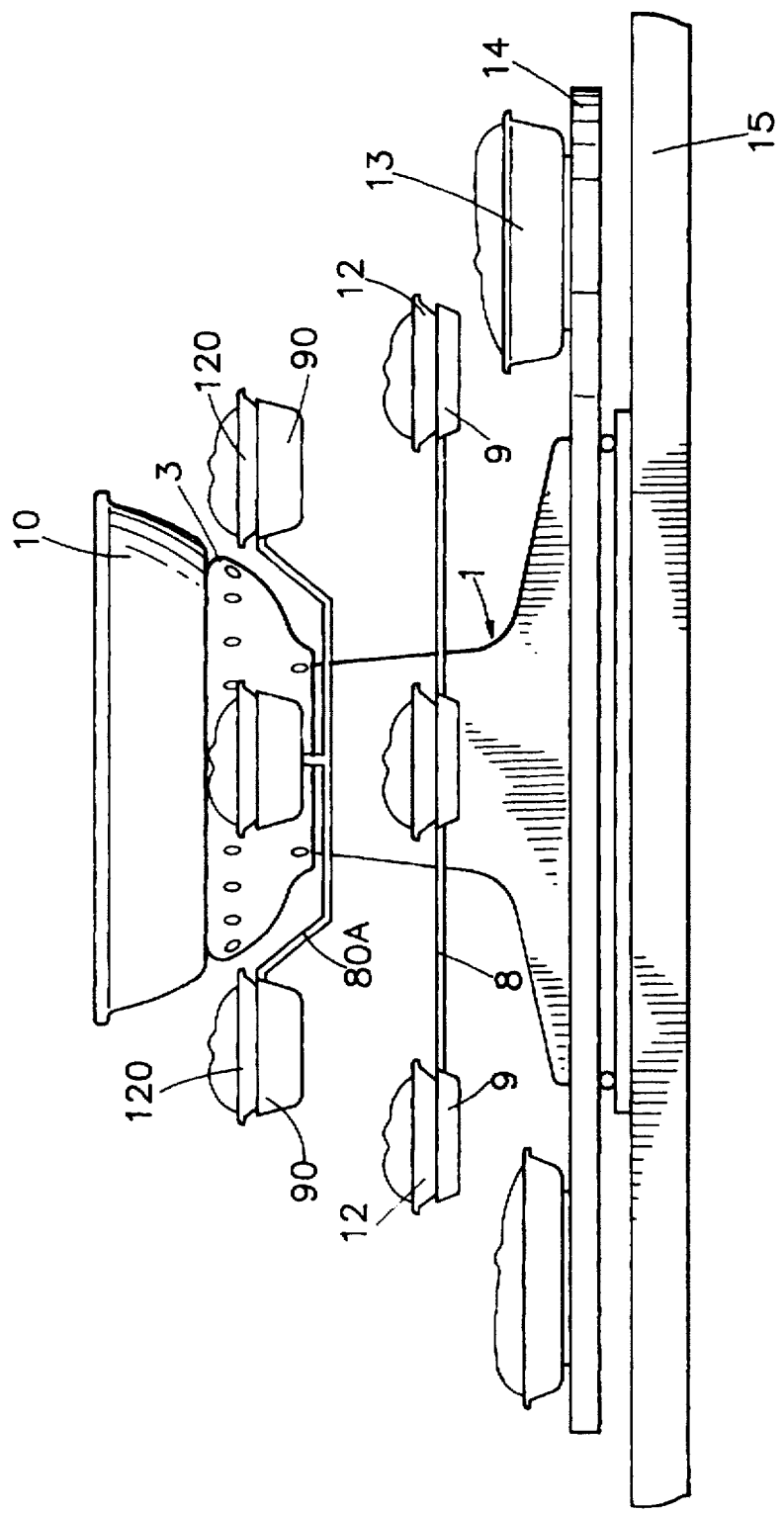
FIG. 4 is a schematic illustration showing the utilization of the other embodiment of the present invention.
Figure 5:
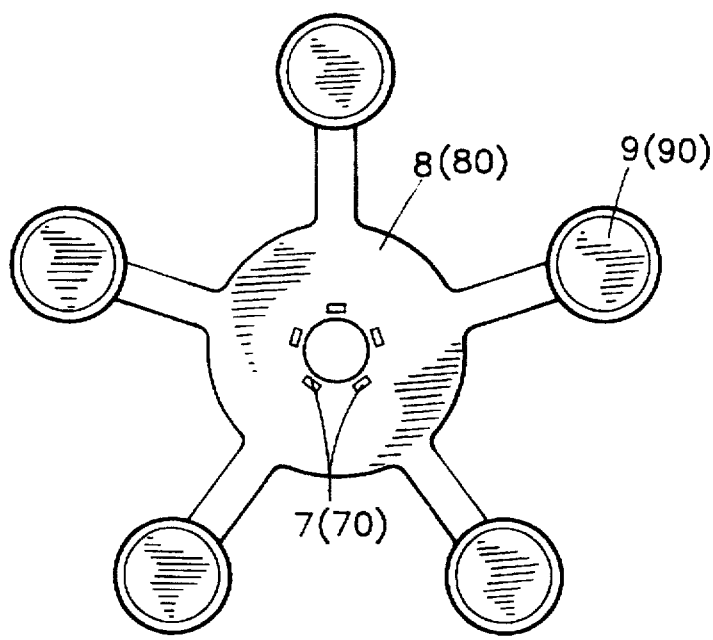
FIG. 5 is a top plan view of the first mode of the rotational disk of the present invention.

In this mode, the rotational disks 8 and 80 are integrally formed, as clearly shown in FIG. 5. The supporting brackets 9, 90 disposed at the periphery of the rotational disk 8, 80 have a circular shape for receiving and supporting dishes or plates thereon. On the other hand, the highest rotational disk 80A can be designed to have a raised configuration brackets 90, as shown in FIG. 4 to provide a larger receiving space for the bowls 120.

Figure 6:
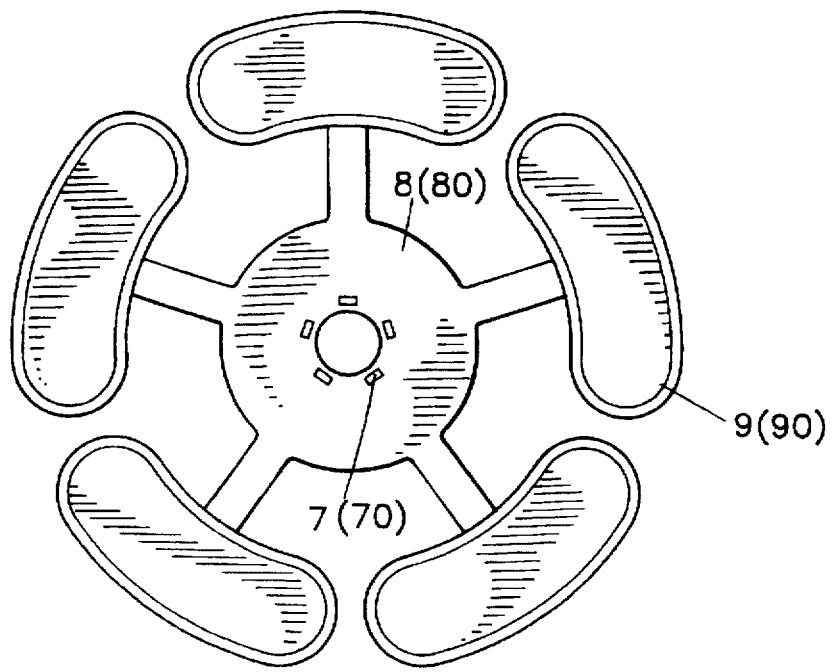
FIG. 6 is a top plan view of the second mode of the rotational disk of the present invention.
Figure 7:
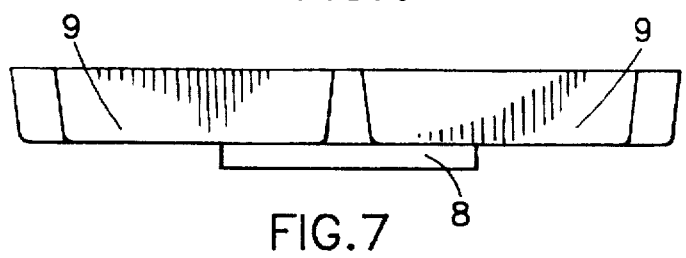
FIG. 7 is a side elevational view of FIG. 6.

In the second mode, the rotational disks 8 and 80 can be designed to serve as an ellipse dish in which the food can be directly held therein, as clearly shown in FIGS. 6 and 7. In this case, no additional dishes are required. In this mode, the external space around the rotational disks 8 and 80 can be efficiently used. The space for food is increased while the outer diameter of the rotational disk can be reduced. On the other hand, the raw food, such as vegetables, pork chips etc. for hot pot can be directly disposed on the dishes. The user may readily enjoy the meal.

Figure 8:
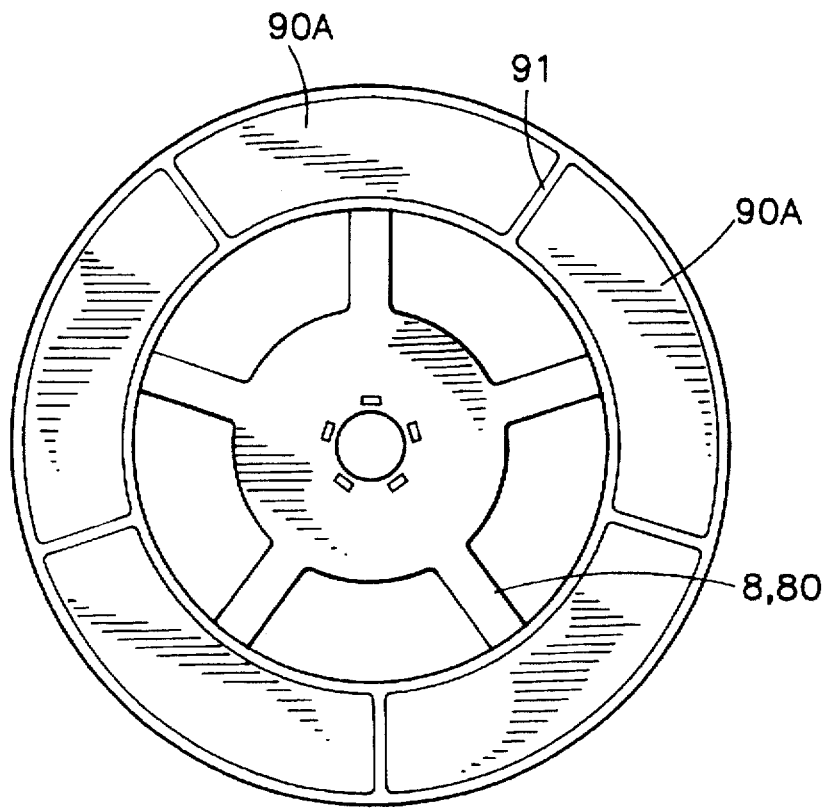
FIG. 8 is still a plan view of a third mode of the rotational disk of the present invention.

According to another mode shown in FIG. 8, the supporting rackets of the rotational disks 8, 80 can also be configured to have an annular shapes 90A with a spacer 91.

Figure 9:
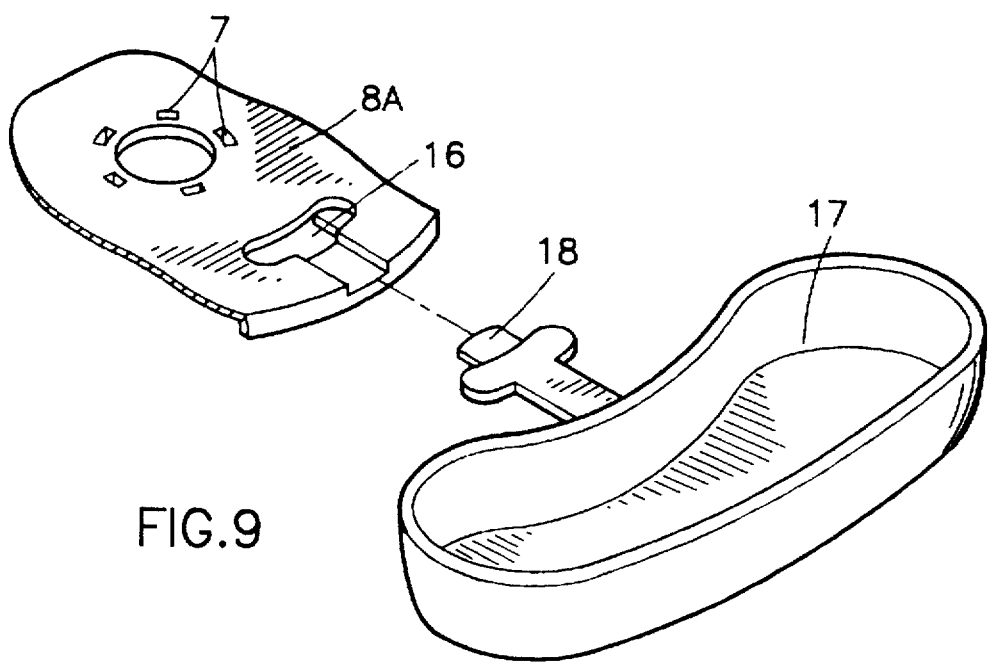
FIG. 9 is a schematic illustration of the forth mode wherein the individual supporting bracket is removably engaged to the rotational disk.

According to the further mode shown in FIG. 9, the rotational disks 8, 80, comprises a plurality of removably supporting brackets 17 with an inserting male portion 18 and a plurality of corresponding inserted female receptacles 16 formed at the outer periphery of the rotational hub 8A. In this manner, the supporting bracket can be formed individually and separately. This unit can be readily attached to the rotational hub 8A. With this design, the overall package size can be reduced.

The fuel used in the oven 3 can be any suitable heating resources, such as solid alcohol 11. However, the gas, electric coil, electromagnetic wave, high frequency wave may also serve as heat resources.

From the forgoing description, it can be readily appreciated that those embodiments are merely for explanatory purpose and not for limitation. For example, the rotational disk can be varied to have more than one story to meet the actual requirements. Furthermore, the shape of the supporting bracket of the rotational disk may also be varied to have different shapes for different application, such as for holding spices, soy sauce, vinegar etc. and other food. In light of this, the rotational disks 8 and 80 can be readily designed to meet different requirements and is not fixed to only have one shape.

While particular embodiment of the present invention has been illustrated and described, it would be obvious to those skilled in the art that various other changes and modifications can be made without departing from the spirit and scope of the invention.

I claim:

1. A turntable assembly having a rotational tableware supporting device comprising a supporting base (1) having an enlarged bottom and a narrow upper portion, said narrow upper portion of said supporting base (1) provided with a first connecting portion (4) including a central recessed portion (40) with a through hole (44) at the center, an annular periphery portion (43) at the outer periphery thereof and an annular flange (42) which has an annular shoulder (41) serving as a guiding rail;

an oven (3) having an open bowl at the top for receiving hot pot or larger bowl and a second connecting portion (5) at the bottom which has a downward extension (50) including a central recessed portion (51) with a locking nut (54) at the center and an annular periphery portion (53) at the outer periphery thereof;

a guiding rail (2) formed between the top of the annular shoulder (41) of said first connecting portion (4) and the bottom of said oven (3) after said oven is removably fixed to said supporting base (1);

a rotational disk (8) provided with a roller assembly (7) at the central portion and a plurality of supporting brackets (9) disposed at the periphery of the rotational disk (8) for receiving and supporting dishes or plates (12) thereon;

a locking bolt (6) being inserted through said through hole (44) of said first connecting portion (4) of said supporting base (1) and locked onto said locking nut (54) of said second connecting portion (5) of said oven (3), whereby when said oven 3 with said second connecting portion (5) is releasably engaged with said supporting base 1 with said first connecting portion (4), and said guiding rail (2) is formed to support said rotational disk (8) which is spaced above the table without touching the articles disposed on the table when said rotational disk (8) is rotating and said rotational disk is thus to support a plurality of courses which are to be served.

2. A turntable assembly having a rotational tableware supporting devices as recited in claim 1, wherein between said oven (3) and said supporting base (1), an intermediate connecting means (19) is further provided to connect said first connecting portion (4) of said supporting base (1) and said second connecting portion (5) of said oven (3), said intermediate connecting means (19) including a top platform (191) with a central through hole (195), an annular flange (190) with an annular shoulder (192), an upper periphery projection (193) and a lower extending portion (194);

a rotational disks (8, 80) each having rollers assembly (7, 70) at the central portion and a plurality of supporting brackets (9, 90) disposed at the periphery of the rotational disk (8, 80) for receiving and supporting dishes or plates (12, 120) thereon;

an upper guiding rail (20) is further formed when the second connecting portion (5) of said oven (3) is engaged with said top platform (191) of said intermediate connecting means (19);

a locking bolt (6) being inserted through said through holes (44) and (195) of said first connecting portion (4) and said intermediate connecting means (19) respectively, and locked onto said locking nut (54) of said second connecting portion (5) whereby when said oven (3), with said second connecting portion (5) together with said intermediate connecting means (19) are releasably engaged with said supporting base (1) with said first connecting portion (4) and wherein an upper guiding rail (20) is formed between the bottom of said oven and the shoulder (192) of said intermediate connecting means (19) and a lower guiding rail (2) is formed between a bottom of said upper periphery projection (193) of said intermediate connecting means (19) and said shoulder (41) of said first connecting portion (4) of said supporting base (1) to support said rotational disks (8, 80) respectively, which are spaced above the table without touching the articles disposed on the table when said rotational disks (8, 80) are rotating and said rotational disks (8, 80) are thus to support a plurality of courses which are to be served.

3. A turntable assembly having a rotational tableware supporting devices as recited in claim 1, wherein at least one intermediate connecting means (19) is provided between said oven (3) and said supporting base (1), and at least two guiding rails and two sets of rotational disks are provided.

4. A turntable assembly having a rotational tableware supporting devices as recited in claim 2, wherein a driving means is further provided inside said intermediate connecting means to drive both said rotational disks to be automatically rotated to be convenient to serve a plurality of courses simultaneously.

* * * * *